No. 717,269. Patented Dec. 30, 1902.
W. F. PROBST.
LUBRICATING DEVICE FOR VEHICLE WHEELS.
(Application filed Sept. 13, 1902.)
(No Model.)
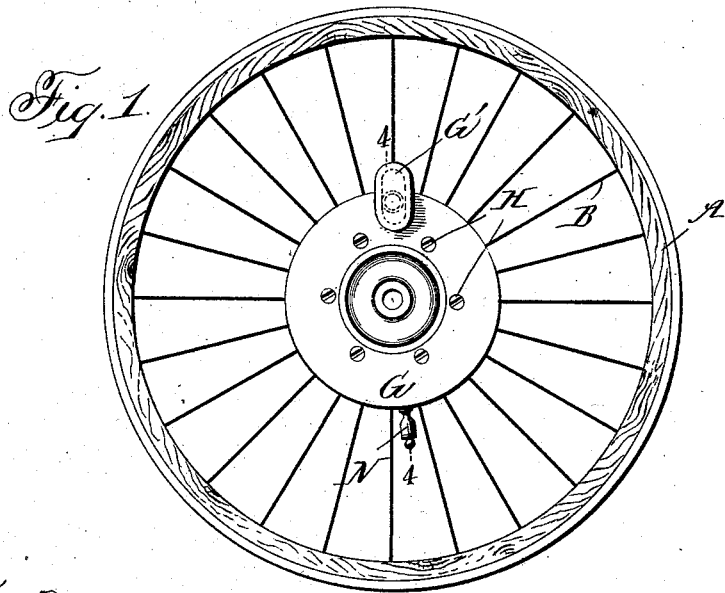
Fig. 1.
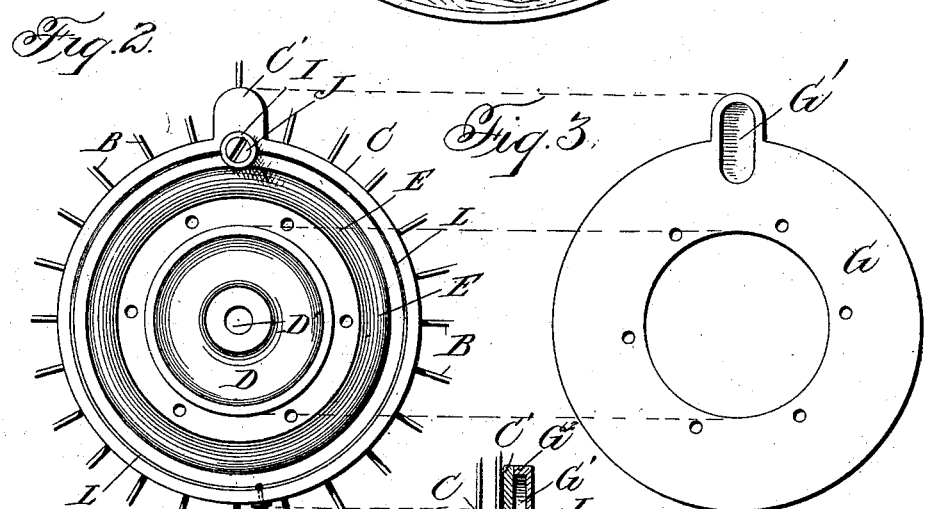
Fig. 2. Fig. 3.
Fig. 4.
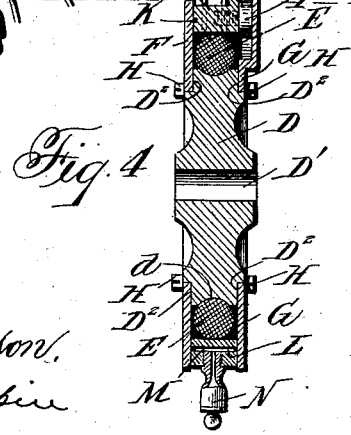
WITNESSES
Jas. E. Hutchinson
Perry B. Turpin
INVENTOR
William F. Probst
By Munn & Co.
Attorneys
THE NORRIS PETERS CO., PHOTO-LITHO., WASHINGTON, D. C.

UNITED STATES PATENT OFFICE.

WILLIAM F. PROBST, OF CHILLICOTHE, OHIO.

LUBRICATING DEVICE FOR VEHICLE-WHEELS.

SPECIFICATION forming part of Letters Patent No. 717,269, dated December 30, 1902.

Application filed September 13, 1902. Serial No. 123,289. (No model.)

*To all whom it may concern:*

Be it known that I, WILLIAM F. PROBST, a citizen of the United States, residing at Chillicothe, in the county of Ross and State of Ohio, have made certain new and useful Improvements in Lubricating Devices for Vehicle-Wheels, of which the following is a specification.

My invention is an improvement in lubricating devices for vehicle-wheels; and it consists in certain novel constructions and combinations of parts, as will be hereinafter described and claimed.

In the drawings, Figure 1 is a side elevation of a wheel embodying my invention. Fig. 2 is a similar view of the central portion of the wheel, the slide-plate being removed. Fig. 3 is a detail view of the removed slide-plate from the inner side thereof, and Fig. 4 is a cross-section on about line 4 4 of Fig. 1.

The wheel, as shown, includes the rim A, which is connected by the spokes B with the spoke-ring C. This ring C encircles the hub D and is spaced apart therefrom to receive the cushion-ring E, which bears between the hub D and the spoke-ring C and cushions the wheel, as will be understood from Figs. 1, 2, and 4. The hub D has a central opening D' for the shaft or axle and may turn on the axle when used on ordinary vehicles or may be fixed to the axle when used on automobiles. At its outer edges the hub is rabbeted at $D^2$ to receive the inner edges of the slide-plates F and G, which are fitted at their inner edges in the said rabbets and secured by means of screws H or in any suitable manner. In its outer edge the hub D is grooved at $d$ to receive the cushion E, which cushion may be a ring circular in cross-section and of rubber or similar resilient material, as will be understood from Figs. 2 and 4.

By the described construction it will be noticed the weight exerted on the hub D will be yieldingly borne by the rim of the wheel through the spokes and spoke-ring C, and in order to retain the latter in proper relation to the hub and also to secure the spoke-ring to turn with the hub I employ the side plates F and G, which are secured at their inner edges to the hub and lap alongside the cushion-ring E and the spoke-ring C and slide along the said spoke-ring, as will be understood from Fig. 4. One of the side plates G is provided near its outer edge with an inwardly-opening radially-extending groove G', in which operates a projection I on the side of the spoke-ring, such projection I being preferably a roller journaled on a screw or stud J to reduce friction as the side plate G travels along the side projection I. This roller I, it will be seen, operates to cause the spoke-ring to turn with the hub and yet does not interfere with the radial sliding of the plate G whenever desired. It will also be noticed that the outer end of the radial groove G' is closed at $G^2$ and the spoke-ring C is provided adjacent to the groove G' with a radially-projecting plate which extends to the outer end of the groove G' and overlaps the end closure $G^2$ and operates to prevent dust and the like from entering the groove G' in all adjustments of the parts. This is an important feature of my invention, as by means of the radial projection C', I protect the groove G' at all times from ingress of obstructions and so insure the parts being in condition to operate as desired at all times.

As the plates F and G slide upon or against the opposite edges of the spoke-ring C, it is important to provide means for lubricating the joint between the plates F and G and the ring C. To this end I provide grooves K and L in the opposite side faces of the spoke-ring C and extending around the said ring and communicating with an oil-feed passage M in communication with the oil-cup N, supported on the spoke-ring C, as shown in Figs. 1, 2, and 4. It will also be noticed the oil-groove L is overlapped by the roller I and extends to the stud J, forming a bearing for the said roller, so the groove L will supply lubricant to relieve friction between the roller I and its bearing J and between the surface of said roller I and the walls of the groove G'. By this means I so arrange the lubricating devices as to supply the lubricant to the sliding bearing between the ring C and the side plates F and G, and also to lubricate both the surface and the journal of the roller I, as before described.

It will be noticed my construction is compactly arranged, does not materially widen the wheel, and that the parts are so constructed and connected as to firmly brace the wheel when assembled for use.

Having thus described my invention, what I claim as new, and desire to secure by Letters Patent, is—

1. The improvement in wheels substantially as herein described, comprising the hub grooved in its outer edge and provided in its opposite faces at its outer edge with the annular rabbets, the slide-plates secured at their inner edges in the said rabbets and projecting outwardly from the said hub, one of said slide-plates being provided with the radially-extending groove in its inner face, said groove being closed at its outer end, the cushion-ring seated in the groove of the hub between the said slide-plates, and the spoke-ring fitting between the slide-plates and upon the cushion-ring and provided with an oil-feed passage and at its opposite faces with oil-grooves extending around the ring and supplying lubricant to the bearing between the sides of the spoke-ring and the slide-plates, and said spoke-ring being provided with the radially-projecting plate overlapping the groove in the slide-plate and extending to the closed outer end thereof, and the roller journaled to the spoke-ring and overlapping the oil-groove in the side thereof, and operating within the groove of the slide-plate, substantially as and for the purposes set forth.

2. The combination in a vehicle-wheel, of the hub and the slide-plates fixed in connection therewith and projecting outwardly from the same, the spoke-ring operating between the said side plates and provided in its opposite faces with annular oil-grooves for lubricating the bearing between the side plates and the said ring, and also having means whereby oil may be supplied to the said grooves, and the cushion operating between the spoke-ring and the hub, and between the opposite side plates, substantially as and for the purposes set forth.

3. The combination of the hub, the spoke-ring, the cushion between the same, and the sliding side plates on opposite sides of the hub and spoke-ring, means whereby the spoke-ring is held to turn with the hub and devices for supplying lubricant to the inner faces of the slide-plates, substantially as set forth.

4. The combination of the hub, the cushion thereon, the spoke-ring on the cushion and provided with a laterally-projecting roller and in its face with an oil-groove overlapped by said roller, and a slide-plate fixed in connection with the hub and sliding along the grooved face of the spoke-ring and having a radially-extending groove to receive the roller of the said ring, all substantially as described, whereby the oil-groove may operate to feed oil to lubricate the roller and may also lubricate the sliding bearing between the spoke-ring and the plate, substantially as set forth.

5. The combination of the hub, the slide-plates on the opposite ends of the hub and projecting radially from the same and spaced apart, the spoke-ring operating between said slide-plates and provided with the spokes and having at its opposite sides the annular grooves, means for supplying lubricant to said grooves, devices connecting the hub-ring slidably with the slide-plates and including a projection crossing one of the grooves in the spoke-ring, and cushioning devices between the spoke-ring and the hub, substantially as set forth.

WILLIAM F. PROBST.

Witnesses:
SOLON C. KEMON,
PERRY B. TURPIN.